(12) United States Patent
Lin et al.

(10) Patent No.: US 11,757,595 B2
(45) Date of Patent: Sep. 12, 2023

(54) NB LTE PRACH DESIGN

(71) Applicant: TELEFONAKTIEBOLAGET LM ERICSSON (PUBL), Stockholm (SE)

(72) Inventors: Xingqin Lin, Santa Clara, CA (US); Ansuman Adhikary, Hyderabad (IN); Niklas Johansson, Uppsala (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 78 days.

(21) Appl. No.: 17/458,934

(22) Filed: Aug. 27, 2021

(65) Prior Publication Data
US 2022/0060303 A1  Feb. 24, 2022

Related U.S. Application Data

(63) Continuation of application No. 16/708,832, filed on Dec. 10, 2019, now Pat. No. 11,108,525, and a continuation of application No. 15/747,503, filed as application No. PCT/IB2016/054399 on Jul. 22, 2016, now Pat. No. 10,554,366.

(60) Provisional application No. 62/197,374, filed on Jul. 27, 2015.

(51) Int. Cl.
*H04L 5/00* (2006.01)
*H04L 27/26* (2006.01)
(Continued)

(52) U.S. Cl.
CPC ........ *H04L 5/0053* (2013.01); *H04L 27/2605* (2013.01); *H04L 27/2613* (2013.01);
(Continued)

(58) Field of Classification Search
CPC ......... H04W 74/0833; H04W 72/0486; H04W 74/0866; H04L 27/2605; H04L 5/0053; H04L 27/2613; H04L 27/26025
See application file for complete search history.

(56) References Cited

U.S. PATENT DOCUMENTS

2010/0098008 A1  4/2010  Ishii et al.
2010/0255867 A1  10/2010  Ishii et al.
(Continued)

FOREIGN PATENT DOCUMENTS

CN  101669399 A  3/2010
CN  103828457 A  5/2014
(Continued)

OTHER PUBLICATIONS

3GPP TR 45.820 v1.4.0; Technical Report; 3rd Generation Partnership Project; Technical Specification Group GSM/EDGE Radio Access Network; Cellular System Support for Ultra Low Complexity an Low Throughput Internet of Things (Release 13)—Jul. 2015.
(Continued)

*Primary Examiner* — Anez C Ebrahim

(57) ABSTRACT

A method in a user equipment is disclosed. The method comprises generating a narrowband random access preamble for a narrowband random access procedure, the narrowband random access preamble comprising a Zadoff-Chu sequence. The method comprises transmitting, to a network node, the generated narrowband random access preamble via a narrowband physical random access channel (PRACH) according to a narrowband PRACH format, wherein the narrowband PRACH is frequency multiplexed with a physical uplink shared channel (PUSCH) and comprises: at least one narrowband PRACH slot having a narrowband PRACH slot duration; and a narrowband PRACH period.

18 Claims, 11 Drawing Sheets

(51) Int. Cl.
*H04W 74/08* (2009.01)
*H04W 72/52* (2023.01)

(52) U.S. Cl.
CPC ....... *H04L 27/26025* (2021.01); *H04W 72/52* (2023.01); *H04W 74/0833* (2013.01); *H04W 74/0866* (2013.01)

(56) References Cited

U.S. PATENT DOCUMENTS

| | | | |
|---|---|---|---|
| 2014/0016534 | A1 | 1/2014 | Kim et al. |
| 2014/0169325 | A1 | 6/2014 | Ratasuk et al. |
| 2014/0198742 | A1 | 7/2014 | Baldemair et al. |
| 2014/0286261 | A1 | 9/2014 | Vujcic |
| 2014/0362701 | A1 | 12/2014 | Roh et al. |
| 2015/0043445 | A1 | 2/2015 | Xiong et al. |
| 2015/0063148 | A1 | 3/2015 | Sadek |
| 2015/0092740 | A1 | 4/2015 | Li et al. |
| 2015/0282155 | A1 | 10/2015 | Webb et al. |
| 2017/0013391 | A1 | 1/2017 | Rico Alvarino et al. |
| 2017/0064694 | A1* | 3/2017 | Wang .................. H04W 72/044 |
| 2018/0206271 | A1* | 7/2018 | Chatterjee ............ H04L 5/0053 |

FOREIGN PATENT DOCUMENTS

| | | |
|---|---|---|
| CN | 103999528 A | 8/2014 |
| CN | 104170445 A | 11/2014 |
| CN | 104365165 A | 2/2015 |
| EP | 2180730 A1 | 4/2010 |
| WO | 2013181808 A1 | 12/2013 |

OTHER PUBLICATIONS

3GPP TS 36.211 V12.2.0; 3rd Generation Partnership Project; Technical Specification Group Radio Access Network; Evolved Universal Terrestrial Radio Access (E-UTRA); Physical channels and modulation, (Release 12)—Jun. 30, 2014.
3GPP TSG GERAN #65 (Tdoc GP-150112); Shanghai, China; Source: Qualcomm Incorporated; Title: NB-OFDMA • Revised Frame Structure; Mar. 9-13, 2015; 8 pages.
3GPP TSG RAN WG1 Meeting #79; San Francisco, USA; Source: Samsung; Title: UE complexity reduction considerations for MTC UEs (R1-144731)—Nov. 17-21, 2014.
3GPP TSG RAN WG1 Meeting #81 (R1-152455); Fukuoka, Japan; Source: Huawei, HiSilicon; Title: PRACH frequency hopping; May 25-29, 2015, 4 pages.
3GPP TSG-RAN WG1 #44-bis; Athens, Greece; Source: Texas Instruments; Title: RACH Preamble Design for E-UTRA (R1-060866)—Mar. 27-31, 2006.
3GPP TSG-RAN WG1 LTE; Denver, Colorado; Source: QUALCOMM Europe; Title: Principles of RACH (R1-060480)—Feb. 13-17, 2006.
3GPP TSG-RAN WG1 Meeting #81 (R1-152548); Source: Nokia Networks; Title: PRACH Configuration for MTC UEs; May 25-29, 2015, 2 pages.
3GPP TSG-RAN WG1 Meeting #81; Fukuoka, Japan; Source: LG Electronics; Title: Details on RACH/PRACH Transmission for MTC UE (R1-152707)—May 25-29, 2015.
3GPP TSG-RAN WG2 #89-bis (R2-151453); Bratislava, Slovakia; Source: Alcatel-Lucent, Alcatel-Lucent Shanghai Bell; Title: Considerations on PRACH for LC-MTC; Apr. 20-24, 2015, 6 pages.
3GPP TSG-RAN1 #82bis; Malmo, Sweden; Source: Ericsson; Title: Narrowband LTE—Random Access Design (R1-156011)—Oct. 5-9, 2015.
Huawei et al., "Discussion on PRACH coverage improvement and mechanism for determining the amount of needed coverage improvement", 3GPP TSG RAN WG1 Meeting #74bis, Guangzhou, China, Oct. 7-11, 2013, R1-134054, p. 1-6, 3GPP, France.
Institute for Information Industry et al., "Dynamic Separate RACH resources for MTC", 3GPP TSG RAN WG2 #74, Barcelona, Spain, May 9-13, 2011, R2-113328, p. 1-5, 3GPP, France.
Samsung, "PRACH Coverage Enhancements for MTC UEs", 3GPP TSG RAN WG1 #75, San Francisco, USA, Nov. 11-15, 2013, R1-135196, p. 1-4, 3GPP, France.
TSG-RAN WG1 #43; Seoul, Korea; Source: Ericsson; Title: E-UTRA Random Access (R1-051445)—Nov. 7-11, 2005.

* cited by examiner

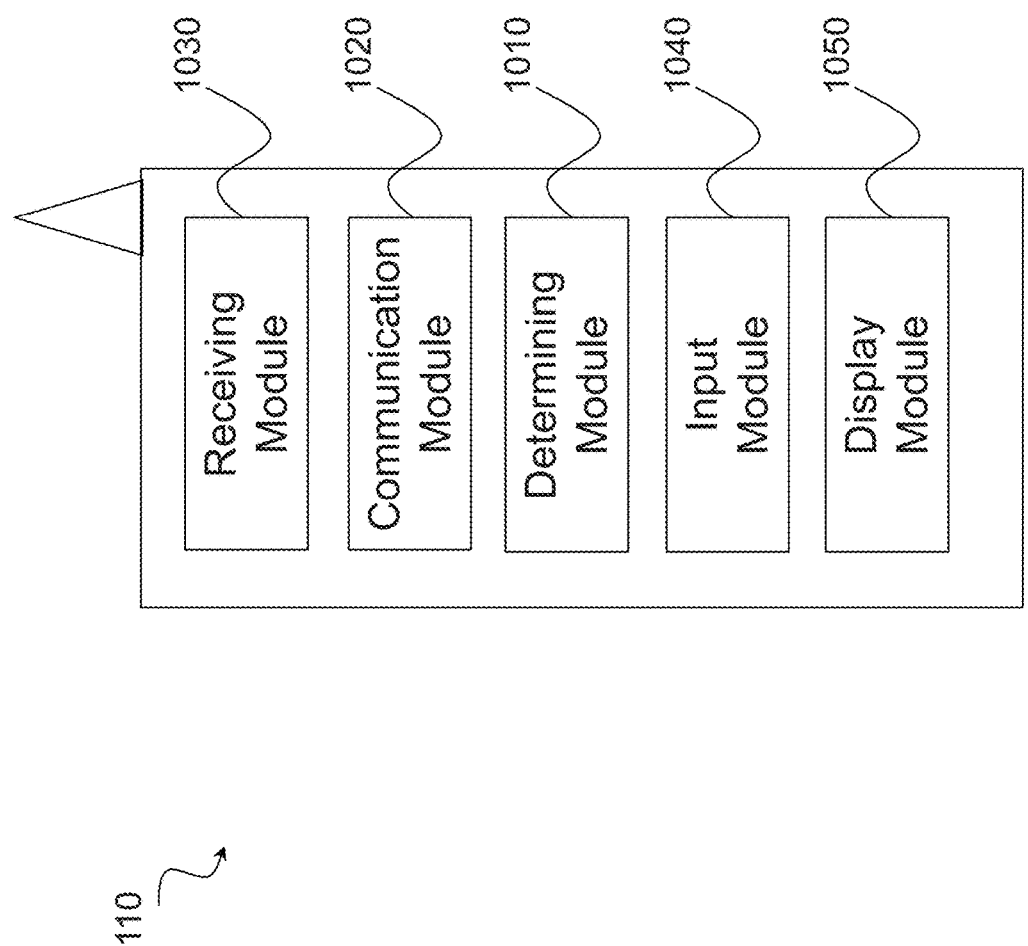

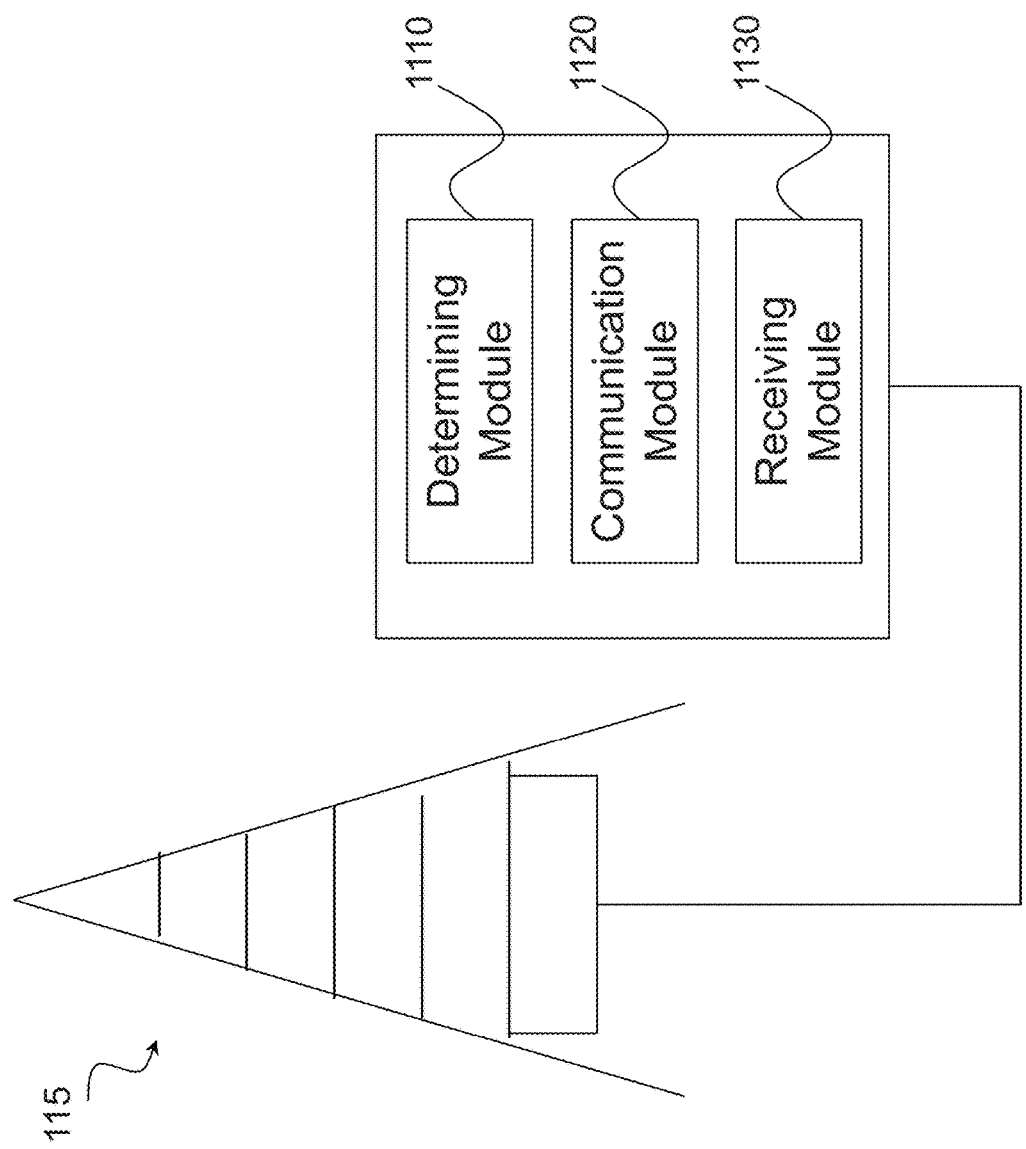

NB LTE PRACH DESIGN

PRIORITY

This nonprovisional application is a continuation of U.S. Nonprovisional application Ser. No. 16/708,832, filed Dec. 10, 2019, which is a continuation of U.S. Nonprovisional application Ser. No. 15/747,503, filed Jan. 25, 2018, now U.S. Pat. No. 10,554,366, which is a 35 U.S.C. § 371 of International Patent Application No. PCT/IB2016/054399, filed Jul. 22, 2016, and entitled "NB LTE PRACH Design" which claims priority to U.S. Provisional Patent Application No. 62/197,374, filed Jul. 27, 2015, the disclosures of which are hereby incorporated by reference in their entirety.

TECHNICAL FIELD

The present disclosure relates, in general, to wireless communications and, more particularly, to narrowband Long Term Evolution Physical Random Access Channel design.

BACKGROUND

The Internet of Things (IoT) is a vision for the future where everything that can benefit from a connection will be connected. Cellular technologies are being developed or evolved to play an indispensable role in the IoT world, particularly machine-type-communication (MTC). MTC is characterized by lower demands on data rates than, for example, mobile broadband, but with higher requirements on low cost device design, better coverage, and the ability to operate for years on batteries without charging or replacing the batteries. To meet the IoT design objectives, 3GPP is currently studying the evolutions of existing 2G/3G/4G Long Term Evolution (LTE) technologies. The current studies under GSM/EDGE Radio Access Network (GERAN) include both Global System for Mobile communications (GSM) evolution and completely new designs.

There are two main so-called "Clean Slate" solutions: (i) Narrowband (NB) Machine-to-Machine (M2M) and (ii) NB Orthogonal Frequency Division Multiple Access (OFDMA). Recently, a merged solution called NB Cellular IoT (CIoT) with NB M2M uplink and NB OFDMA downlink has been proposed and studied in GERAN. These Clean Slate solutions are NB systems with a carrier bandwidth of 200 kHz. The Clean Slate solutions target improved coverage compared to today's GSM systems, long battery life, and low complexity communication design. One intention with the Clean Slate solutions is to deploy them in spectrum that is currently used for GSM, which can be achieved by reducing the bandwidth used by GSM and deploying NB Clean Slate systems in the spectrum that becomes available. Another intention is to reuse existing GSM sites for the deployment of NB Clean Slate systems. 3GPP has decided to move the work on specifying an NB MTC solution from GERAN to RAN.

In existing LTE random access design, random access serves multiple purposes. These purposes include initial access when a user equipment (UE) establishes a radio link, scheduling request, etc. Among others, a main objective of random access is to achieve uplink (UL) synchronization, which is important for maintaining the UL orthogonality in LTE. LTE random access can be either contention-based or contention-free. The contention-based random access procedure consists of four steps:

1) From UE to eNB: Random access preamble;
2) From eNB to UE: Random access response;
3) From UE to eNB: Scheduled transmission; and
4) From eNB to UE: Contention resolution.

Note that only Step 1 involves physical-layer processing specifically designed for random access. The remaining three steps (Steps 2-4) follow the same physical-layer processing used in UL and downlink (DL) data transmission. For contention-free random access, the UE uses reserved preambles assigned by the base station. In this case, contention resolution is not needed, and thus only Steps 1 and 2 are required.

In LTE, random access preambles are sent in the Physical Random Access Channel (PRACH). The PRACH subcarrier spacing is 1.25 kHz, and the preambles are Zadoff-Chu sequences of length 839. A fixed number of preambles (64) are available in each LTE cell. Several preamble formats of different durations of the sequence and cyclic prefix are defined to be used for cells of different sizes. The format configured in a cell is broadcast in the System Information.

One prominent feature of NB LTE is in-band operation (i.e., NB LTE can be deployed within a wideband LTE subcarrier by puncturing one physical resource block (PRB) in the LTE carrier and using it for NB LTE transmission). To enable this in-band operation, it is important to synthesize the NB LTE numerologies with legacy LTE to avoid mutual interference between NB LTE and legacy LTE as much as possible.

In NB LTE, the random access procedure follows its counterpart in LTE. Due to the reduced bandwidth in NB LTE, however, LTE PRACH design cannot be directly applied to NB LTE. As noted above, the LTE PRACH subcarrier spacing is 1.25 kHz and the preambles are Zadoff-Chu sequences of length 839. Thus, the total used bandwidth is 1.0488 MHz (excluding guard band). In contrast, NB LTE is designed to operate with a carrier bandwidth of 200 kHz (more precisely, the usable bandwidth is 180 kHz), making LTE PRACH design inapplicable to NB LTE.

Another relevant consideration is the subcarrier spacing for the Physical Uplink Shared Channel (PUSCH) in NB LTE. In NB LTE, PUSCH may have any suitable subcarrier spacing. As one example, in NB LTE the subcarrier spacing for PUSCH can be 2.5 kHz, which is reduced by 6 times compared to the 15 kHz subcarrier spacing of LTE. One approach to PRACH design for NB LTE would be to reduce the 1.25 kHz subcarrier spacing by 6 times and reuse the length-839 Zadoff-Chu sequences. There are, however, several problems with this design. First, the reduced subcarrier spacing is 208.3 Hz, which is relatively small considering the frequency offset between the device and base station and Doppler shift. Second, the total used bandwidth for PRACH would be 174.8 kHz (208.3*839=174.8 kHz), while the total uplink bandwidth is 180 kHz in NB LTE. As a result, at most two 2.5 kHz subcarriers can be used for PUSCH, and there is no guard band between PUSCH and PRACH when they are frequency multiplexed. As a result, the PUSCH capacity for continuous packet transmissions of users in bad coverage may be limited. Furthermore, different durations of the sequence and cyclic prefix are needed to support cells of different sizes in LTE. This requires more information to be broadcast in System Information. Thus, there is a need for an improved PRACH design for NB LTE.

SUMMARY

To address the foregoing problems with existing approaches, disclosed is a method in a user equipment. The method comprises generating a narrowband random access preamble for a narrowband random access procedure, the narrowband random access preamble comprising a Zadoff-Chu sequence. The method comprises transmitting, to a network node, the generated narrowband random access preamble via a narrowband physical random access channel (PRACH) according to a narrowband PRACH format, wherein the narrowband PRACH is frequency multiplexed with a physical uplink shared channel (PUSCH) and comprises: at least one narrowband PRACH slot having a narrowband PRACH slot duration; and a narrowband PRACH period.

In certain embodiments, the narrowband random access preamble may be a Zadoff-Chu sequence of length 491. The generated narrowband random access preamble may comprise a duration of 3.2 ms, and the narrowband PRACH may comprise a cyclic prefix of 0.4 ms and a guard time of 0.4 ms. The narrowband PRACH may comprise a subcarrier spacing of 312.5 Hz. The narrowband PRACH may comprise at least one subcarrier guard band between the PRACH and the PUSCH. The narrowband PRACH slot duration and the narrowband PRACH period may be based on one or both of: a cell load of a cell associated with the network node; and a cell size of the cell associated with the network node. The narrowband PRACH slot duration may be 12 ms.

In certain embodiments, the narrowband PRACH slot may comprise at least one narrowband PRACH segment. The method may comprise randomly selecting one of a plurality of possible narrowband random access preambles as the narrowband random access preamble to generate. The method may comprise randomly selecting one of the at least one narrowband PRACH segments for transmitting the selected one of the plurality of possible narrowband random access preambles.

In certain embodiments, the method may comprise determining a coverage level of the user equipment, and selecting, based on the determined coverage level of the user equipment, the narrowband PRACH format from among one or more narrowband PRACH formats. The coverage level of the user equipment may comprise one or more of a basic coverage level, a robust coverage level, and an extreme coverage level. The method may comprise repeating transmission of the narrowband random access preamble according to the selected narrowband PRACH format.

Also disclosed is a user equipment. The user equipment comprises one or more processors. The one or more processors are configured to generate a narrowband random access preamble for a narrowband random access procedure, the narrowband random access preamble comprising a Zadoff-Chu sequence. The one or more processors are configured to transmit, to a network node, the generated narrowband random access preamble via a narrowband physical random access channel (PRACH) according to a narrowband PRACH format, wherein the narrowband PRACH is frequency multiplexed with a physical uplink shared channel (PUSCH) and comprises: at least one narrowband PRACH slot having a narrowband PRACH slot duration; and a narrowband PRACH period.

Also disclosed is a method in a network node. The method comprises configuring, based on one or more criteria, a narrowband physical random access channel (PRACH) slot duration and a narrowband PRACH period for a narrowband random access procedure by a user equipment. The method comprises receiving, from the user equipment, a narrowband random access preamble via a narrowband PRACH according to a narrowband PRACH format, wherein the narrowband random access preamble comprises a Zadoff-Chu sequence, and wherein the narrowband PRACH is frequency multiplexed with a physical uplink shared channel (PUSCH) and comprises: at least one narrowband PRACH slot having the configured narrowband PRACH slot duration; and the configured narrowband PRACH period.

In certain embodiments, the narrowband random access preamble may be a Zadoff-Chu sequence of length 491. The received narrowband random access preamble may comprise a duration of 3.2 ms. The narrowband PRACH may comprise a cyclic prefix of 0.4 ms and a guard time of 0.4 ms. The narrowband PRACH may comprise a subcarrier spacing of 312.5 Hz. The narrowband PRACH may comprise at least one subcarrier guard band between the narrowband PRACH and the PUSCH. The one or more criteria may comprise one or more of: a cell load of a cell associated with the network node; and a cell size of the cell associated with the network node. The configured narrowband PRACH slot duration may be 12 ms.

In certain embodiments, the narrowband PRACH slot may comprise at least one narrowband PRACH segment. The method may comprise configuring the user equipment to randomly select one of a plurality of possible narrowband random access preambles to generate, and configuring the user equipment to randomly select one of the at least one narrowband PRACH segments for transmitting the selected one of the plurality of possible narrowband random access preambles.

In certain embodiments, the method may comprise determining the narrowband PRACH format according to which the narrowband random access preamble was received, and determining a coverage level of the user equipment based on the determined narrowband PRACH format. The coverage level of the user equipment may comprise one or more of a basic coverage level, a robust coverage level, and an extreme coverage level. The narrowband PRACH format according to which the narrowband random access preamble was received may be determined based on a number of repeat transmissions of the narrowband random access preamble. In certain embodiments, the method may comprise scheduling the user equipment according to the determined coverage level of the user equipment.

Also disclosed is a network node. The network node comprises one or more processors. The one or more processors are configured to configure, based on one or more criteria, a narrowband physical random access channel (PRACH) slot duration and a narrowband PRACH period for a narrowband random access procedure by a user equipment. The one or more processors are configured to receive, from the user equipment, a narrowband random access preamble via a narrowband PRACH according to a narrowband PRACH format, wherein the narrowband random access preamble comprises a Zadoff-Chu sequence, and wherein the narrowband PRACH is frequency multiplexed with a physical uplink shared channel (PUSCH) and comprises: at least one narrowband PRACH slot having the configured narrowband PRACH slot duration; and the configured narrowband PRACH period.

Certain embodiments of the present disclosure may provide one or more technical advantages. As one example, certain embodiments may allow for flexible PUSCH and PRACH multiplexing, which may advantageously enable continuous packet transmissions of users in bad coverage. As another example, certain embodiments may include carefully selected subcarrier spacing and preamble length. This may advantageously enhance PRACH detection performance, enable the 164 dB maximum coupling loss target to be met, and enable satisfactory time-of-arrival estimation at the base stations. As still another example, in certain embodiments the PRACH design is flexible and can be configured based on one or more of cell size and system load. As yet another example, in certain embodiments the PRACH design fits well within the overall frame structure of NB LTE, and can advantageously be used to distinguish users in different coverage classes. As yet another example, in certain embodiments well-designed cyclic prefix and guard period structure may advantageously enable a single configuration to support cell sizes up to 60 km. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 10 is a block schematic of an exemplary wireless device, in accordance with certain embodiments; and FIG. 11 is a block schematic of an exemplary network node, in accordance with certain embodiments.

DETAILED DESCRIPTION

Figure 1:
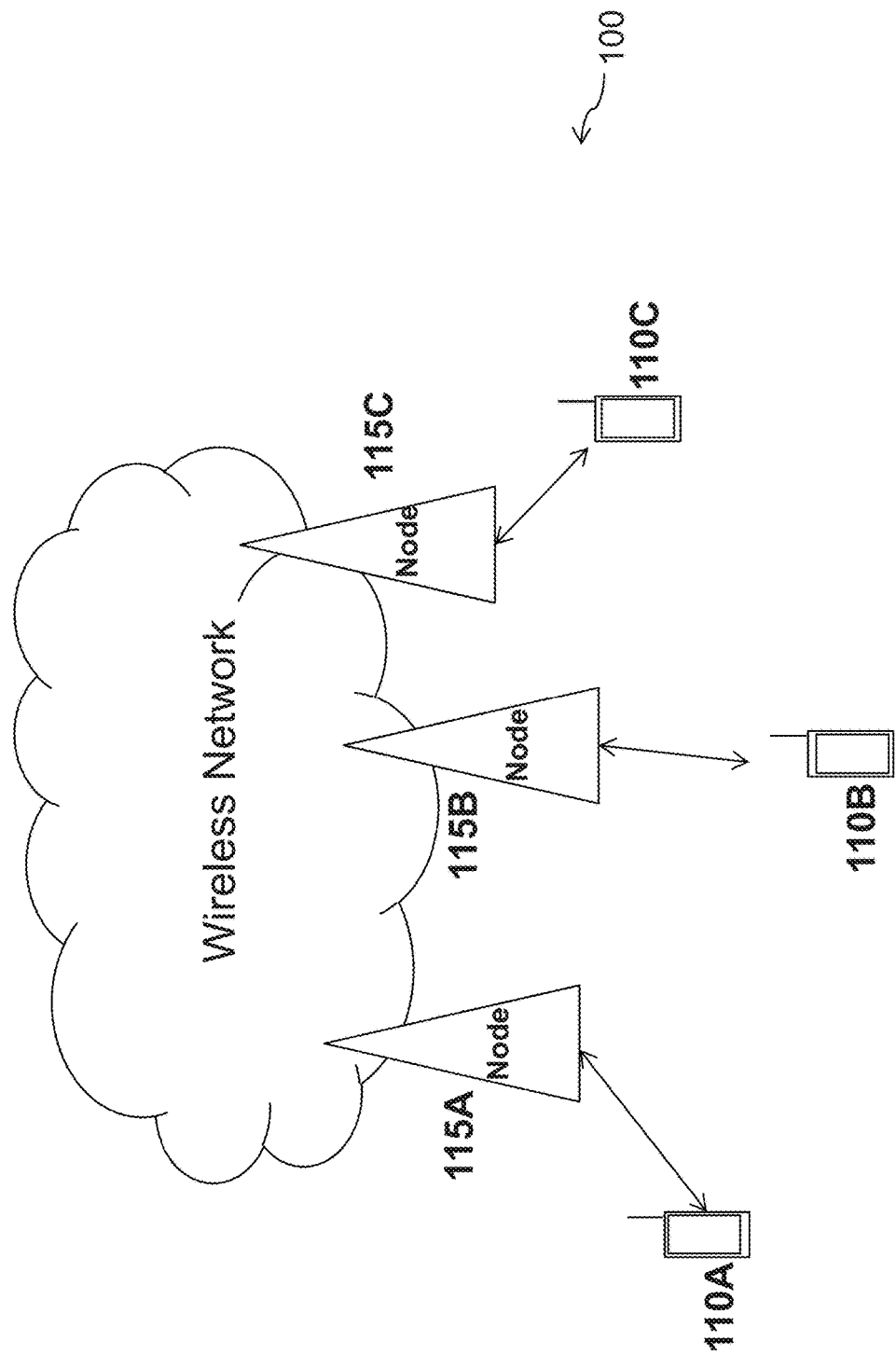
FIG. 1 illustrates an example embodiment of a wireless communications network, in accordance with certain embodiments.

As described above, due to the reduced bandwidth in NB LTE, the LTE PRACH design cannot be directly applied to NB LTE. Existing approaches for enabling a NB LTE PRACH design, which use reduced subcarrier spacing and reuse the length-839 Zadoff-Chu sequences of the LTE PRACH design, suffer from certain deficiencies. Namely, the reduced subcarrier spacing of the existing approach is relatively small considering the frequency offset between the device and base station and Doppler shift. Furthermore, the total bandwidth used would limit the bandwidth that could be used for PUSCH, and would provide no guard band between PUSCH and PRACH when they are frequency multiplexed. This may limit PUSCH capacity for continuous packet transmissions of users in bad coverage.

The present disclosure contemplates various embodiments that may address these and other deficiencies associated with existing approaches to NB LTE PRACH design. In certain embodiments, a novel orthogonal frequency division multiplexing (OFDM) PRACH design for NB LTE is proposed. The general design principles follow those of LTE, but novel modifications are proposed to adapt the LTE PRACH design to NB LTE, which operates with a much reduced 200 kHz bandwidth. In certain embodiments, the proposed PRACH design uses 160 kHz bandwidth in the uplink, leaving 20 kHz bandwidth for continuous uplink packet transmissions. New subcarrier spacing is proposed for generating random access preambles, and a new set of Zadoff-Chu sequences are proposed as preambles for random access in NB systems. In certain embodiments, 312.5 Hz subcarrier spacing and length-491 Zadoff-Chu sequences for preambles are used, which strikes a good balance between robustness to carrier frequency offset/Doppler shift and maximizes the number of orthogonal preambles for the NB LTE systems. In certain embodiments, the PUSCH and PRACH are frequency multiplexed to allow continuous uplink traffic transmission. The cyclic prefix and guard period are carefully dimensioned to maximize coverage. In certain embodiments, this may enable a single configuration to be applicable to cells of sizes up to 60 km. The design described herein may also allow multiple random access segments to be configured in the same random access slot, facilitating coherent combination of received preambles over consecutive segments transmitted by users in bad coverage. In addition, different random access formats can be used by users in different coverages, from which base stations (such as eNBs) can implicitly derive users' coverage classes and make scheduling decisions accordingly. The design described herein also may enable joint random preamble selection and random segment selection, which helps reduce random access collision rate.

According to one example embodiment, a method in a UE is disclosed. The method may comprise generating a NB random access preamble for a NB random access procedure, the NB random access preamble comprising a Zadoff-Chu sequence. The method may comprise transmitting, to a network node, the generated NB random access preamble via a NB PRACH according to a NB PRACH format, wherein the NB PRACH is frequency multiplexed with PUSCH and comprises: at least one NB PRACH slot having a NB PRACH slot duration; and a NB PRACH period.

According to another example embodiment, a method in a network node is disclosed. The method may comprise configuring, based on one or more criteria, a NB PRACH slot duration and a NB PRACH period for a NB random access procedure by a UE. The method may comprise receiving, from the UE, a NB random access preamble via a NB PRACH according to a NB PRACH format, wherein the NB random access preamble comprises a Zadoff-Chu sequence, and wherein the NB PRACH is frequency multiplexed with PUSCH and comprises: at least one NB PRACH slot having the configured NB PRACH slot duration; and the configured NB PRACH period.

The various embodiments described herein may provide one or more technical advantages. As one example, certain embodiments may allow for flexible PUSCH and PRACH multiplexing, which may advantageously enable continuous packet transmissions of users in bad coverage. As another example, certain embodiments may include carefully selected subcarrier spacing and preamble length. This may advantageously enhance PRACH detection performance, enable the 164 dB maximum coupling loss target to be met, and enable satisfactory time-of-arrival estimation at the base stations (e.g., eNBs). As still another example, in certain embodiments the PRACH design is flexible and can be configured based on one or more of cell size and system load. As yet another example, in certain embodiments the PRACH design fits well within the overall frame structure of NB LTE, and can advantageously be used to distinguish users in different coverage classes. As yet another example, in certain embodiments well-designed cyclic prefix and guard period structure may advantageously enable a single configuration to support cell sizes up to 60 km. Other advantages may be readily apparent to one having skill in the art. Certain embodiments may have none, some, or all of the recited advantages.

FIG. 1 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as eNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more UEs 110, and one or more different types of network nodes capable of communicating (directly or indirectly) with UEs 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, basic coverage, robust coverage, extreme coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, translation node (e.g., PLAT) or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 7-11.

Although FIG. 1 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

As described above, due to the reduced bandwidth of NB LTE, legacy LTE PRACH design cannot be reused in NB LTE. Compared to the existing design, the new NB LTE PRACH design described herein allows for flexible PUSCH and PRACH multiplexing, provides enhanced PRACH detection performance, enables configurable formats based on cell size and/or system load, fits well within the overall frame structure of NB LTE, and supports users of different coverage classes. Various features of the new NB LTE PRACH design are described below in relation to FIGS. 2-4, including multiplexing of PRACH with PUSCH, preamble design, and PRACH dimensioning.

Figure 2:
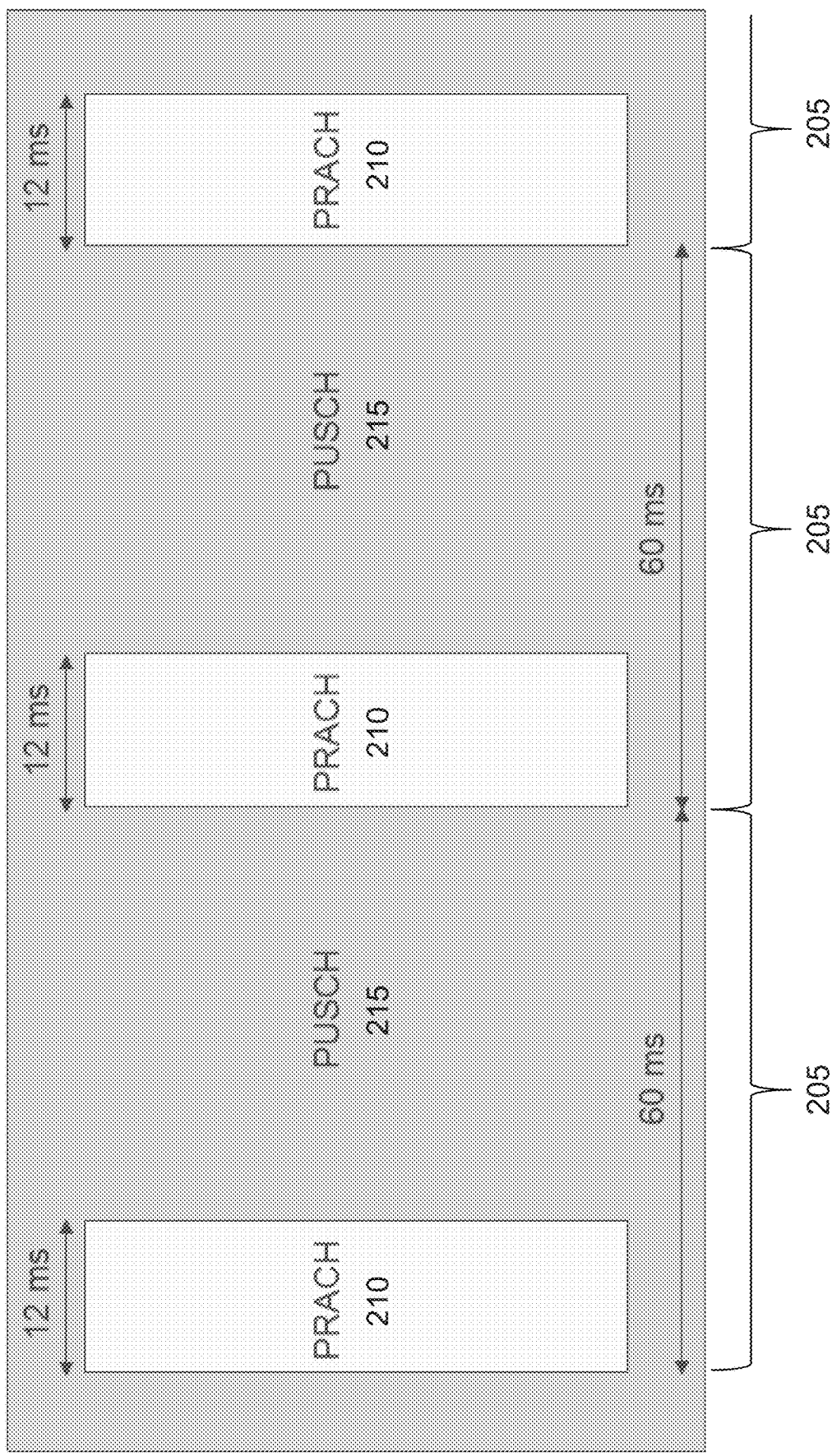
FIG. 2 illustrates an example of PRACH multiplexing with PUSCH in NB LTE, in accordance with certain embodiments.

FIG. 2 illustrates an example of PRACH multiplexing with PUSCH in NB LTE, in accordance with certain embodiments. More particularly, FIG. 2 illustrates a time-frequency grid having three PRACH periods 205. Each PRACH period 205 includes a PRACH slot 210 and PUSCH 215. PRACH periods 205, PRACH slots 210, and PUSCH 215 may have any suitable duration. In the example of FIG. 2, each PRACH period 205 has a duration of 60 ms, and each PRACH slot 210 has a duration of 12 ms.

PRACH time-frequency resources can be configured in any suitable manner. For example, in certain embodiments PRACH time-frequency resources can be configured by a base station, such as eNB 115 described above in relation to FIG. 1. The time-frequency resources configuration can depend on any suitable factors. For example, in certain embodiments the time-frequency resources configuration may depend on one or more of the random access load, the cell size, or any other suitable factor. Note that PUSCH 215 can still be frequency multiplexed with PRACH in PRACH slots 210. This design is motivated by the fact that users in bad coverage may require a long time to finish their packet transmissions. Thus, in certain embodiments some edge subcarriers are reserved for PUSCH, which may advantageously allow continuous traffic transmissions of wireless devices (such as wireless device 110 describe above in relation to FIG. 1) in bad coverage, given that the wireless devices are scheduled on the edge subcarriers.

Figure 3:
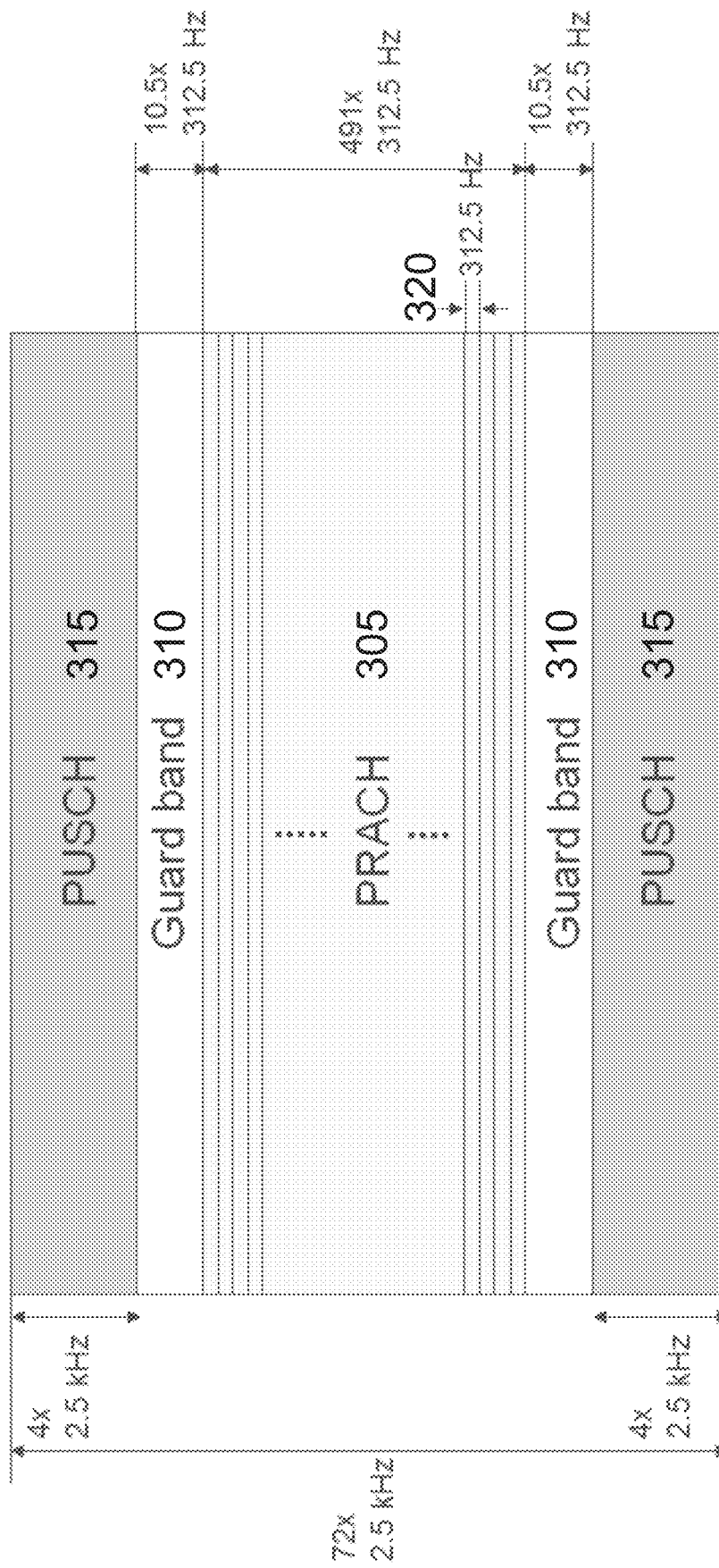
FIG. 3 illustrates an example design of PRACH preamble length and subcarrier spacing, in accordance with certain embodiments.

FIG. 3 illustrates an example design of PRACH preamble length and subcarrier spacing, in accordance with certain embodiments. More particularly, FIG. 3 illustrates PRACH 305, a pair of guard bands 310, and PUSCH 315. PRACH 305 is made up of a plurality of subcarriers 320. PRACH 305, guard bands 310, PUSCH 315, and subcarriers 320 may have any suitable dimensions. In the example embodiment of FIG. 3, PRACH 305 includes 491 PRACH subcarriers 320, with each PRACH subcarrier 320 having a size of 312.5 Hz. Each guard band 310 is made up of 10.5 subcarriers, each having a size of 312.5 Hz. Each PUSCH 315 is made up of four subcarriers, each subcarrier having a size of 2.5 kHz.

In certain embodiments, a portion of the bandwidth is reserved for PUSCH 315. This may advantageously allow for continuous uplink packet transmission. The amount of bandwidth reserved for PUSCH 315 may vary according to particular implementations. As one example, in certain embodiments eight 2.5 kHz edge subcarriers are reserved for PUSCH 315 (four on either side of guard bands 310). This leaves 160 kHz bandwidth for PRACH 305. On the one hand, large subcarrier spacing is desirable in order to make the preamble transmission robust to carrier frequency offset and Doppler shift. On the other hand, longer Zadoff-Chu sequence based preambles are preferred. This is because orthogonal preambles are derived by applying cyclic shifts to a base Zadoff-Chu sequence. For a given cell size (i.e., a given cyclic shift), the longer the preambles, the more orthogonal the preambles. With 160 kHz bandwidth for PRACH 305, a tradeoff exists between PRACH subcarrier spacing and preamble length. Further, the choice should enable PRACH to fit well within the overall frame structure in NB LTE.

Taking into account all the constraints, the example embodiment illustrated in FIG. 3 reduces the 1.25 kHz LTE PRACH subcarrier bandwidth by four times for NB LTE PRACH 305 (i.e., subcarrier spacing of 312.5 Hz). It is important to leave some guard band between PUSCH 315 and PRACH 305 to mitigate their mutual interference. Reserving about one data subcarrier guard band is required between PRACH 305 and PUSCH 315. Therefore, the actually used bandwidth for NB LTE PRACH in the example embodiment of FIG. 3 is 155 kHz. Thus, the maximum preamble length is 496 (155/0.3125=496). To maximize the number of potential preambles that have good cross-correlation property, Zadoff-Chu sequence length is selected to be prime. The largest prime number less than 496 is 491. Therefore, in the example embodiment of FIG. 3 length-491 Zadoff-Chu sequences are used as preambles. The length-491 Zadoff-Chu sequences are mapped to 312.5 Hz spaced subcarriers.

Figure 4:
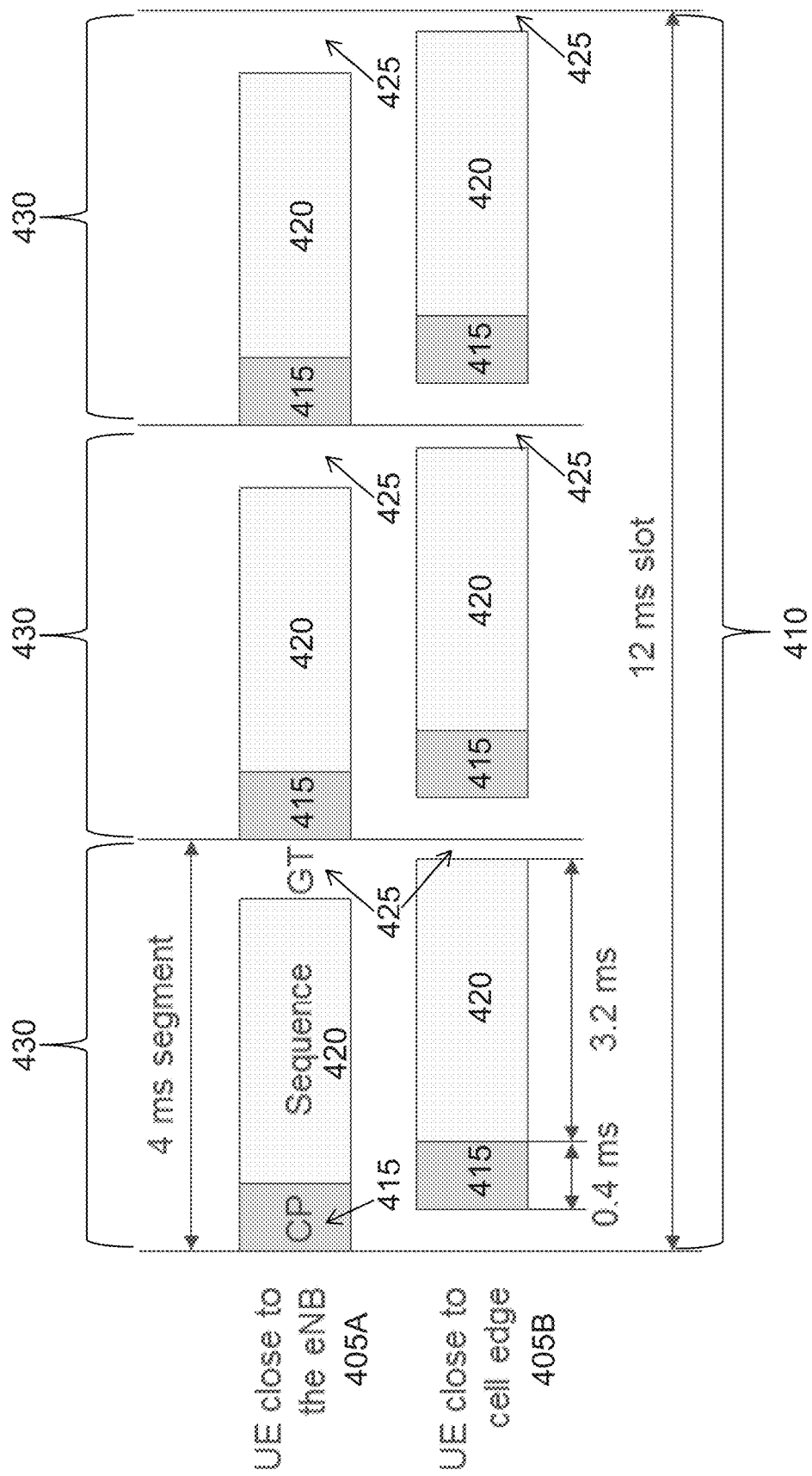
FIG. 4 illustrates an example of PRACH cyclic prefix and guard period dimensioning, in accordance with certain embodiments.

FIG. 4 illustrates an example of PRACH cyclic prefix and guard period dimensioning, in accordance with certain embodiments. More particularly, FIG. 4 illustrates two scenarios 405A and 405B over the course of one PRACH slot 410. In scenario 405A, the UE (such as UE 110 described above in relation to FIG. 1) is close to the eNB (such as eNB 115 described above in relation to FIG. 1). In scenario 405B, the UE is close to cell edge. For each of scenarios 405A and 405B, the cyclic prefix 415, preamble sequence 420, and guard time 425 are illustrated.

The duration of PRACH slot 410 and the PRACH period can be configured depending on any suitable factors. For example, in certain embodiments the duration of PRACH slot 410 and the PRACH period can be configured depending on the load and cell size. FIG. 4 illustrate one example configuration.

In the example embodiment of FIG. 4, with 312.5 Hz subcarrier spacing, preamble sequence 420 has a duration of 3.2 ms. In the example configuration of FIG. 4, PRACH slot 410 has a duration of 12 ms. Each 12 ms PRACH slot 410 is further divided into three 4 ms PRACH segments 430. Since the duration of preamble sequence 420 is 3.2 ms, there are 0.8 ms resources remaining for cyclic prefix 415 and guard time 425. In the example embodiment of FIG. 4, the cyclic prefix is dimensioned to be 0.4 ms to maximize coverage (ignoring the delay spread, which is on the order of a few µs and has marginal impact).

In the example embodiment of FIG. 4, cyclic prefix 415 having a duration of 0.4 ms can address cell sizes up to 60 km. Also, with 512 point IFFT for PRACH preamble generation, the size of cyclic prefix 415 amounts to 64 samples, making adding cyclic prefix straightforward in baseband processing. Though preambles are defined in frequency domain, devices (such as wireless device 110 described above in relation to FIG. 1) can directly generate the preambles in time domain and can therefore bypass the 512 point IFFT operation. Moreover, Zadoff-Chu sequences have constant amplitude, leading to minimal requirements on power amplifiers of low cost MTC devices.

Based on the cyclic prefix and guard time dimensioning described above in relation to FIG. 4, three example PRACH formats are defined in Table 1 below. Although the example of Table 1 includes three PRACH formats, the present disclosure contemplates that any suitable number of PRACH formats may be used, and the number of PRACH formats may vary according to particular implementations. In the example of Table 1, Formats 0, 1, and 2 are respectively used by users in basic, robust, and extreme coverage in NB LTE. As used herein, the basic, robust, and extreme coverage levels refer generally to three different coverage levels. In cases where more or less than three PRACH formats are used, greater or fewer coverage levels may be defined. The specifics of each coverage level may vary according to particular implementations. As one example, in certain embodiments basic coverage is defined with respect to traditional GSM/GPRS network coverage (i.e., 144 dB), robust coverage yields +10 dB coverage extension (i.e., 154 dB), and extreme coverage yields +20 dB coverage extension (i.e., 164 dB). In such a case, network coverage refers to what extent the network can reach the devices. For example, extreme coverage (i.e., 164 dB) may allow the network to reach devices, such as wireless device 110 described above, that are located, for example, in a deep basement. Note that the formats in Table 1 are examples; detailed numbers of repetitions can vary.

TABLE 1

PRACH formats

| Format | Tcp (ms) | Tseq (ms) | repetitions |
|---|---|---|---|
| 0 | 0.4 | 3.2 | 1 |
| 1 | 0.4 | 3.2 | 6 |
| 2 | 0.4 | 3.2 | 18 |

For users in basic coverage (using Format 0 in Table 1 above), one PRACH segment is sufficient to send their preambles. As there are three segments per 12 ms PRACH slot, users in basic coverage can randomly choose one of the three segments, tripling the random access capacity. For users in robust coverage (using Format 1 in Table 1 above), each preamble transmission is repeated six times and thus occupies two 12 ms PRACH slots. For users in extreme coverage (using Format 2 in Table 1 above), each preamble transmission is repeated 18 times and thus requires six 12 ms PRACH slots.

Figure 5:
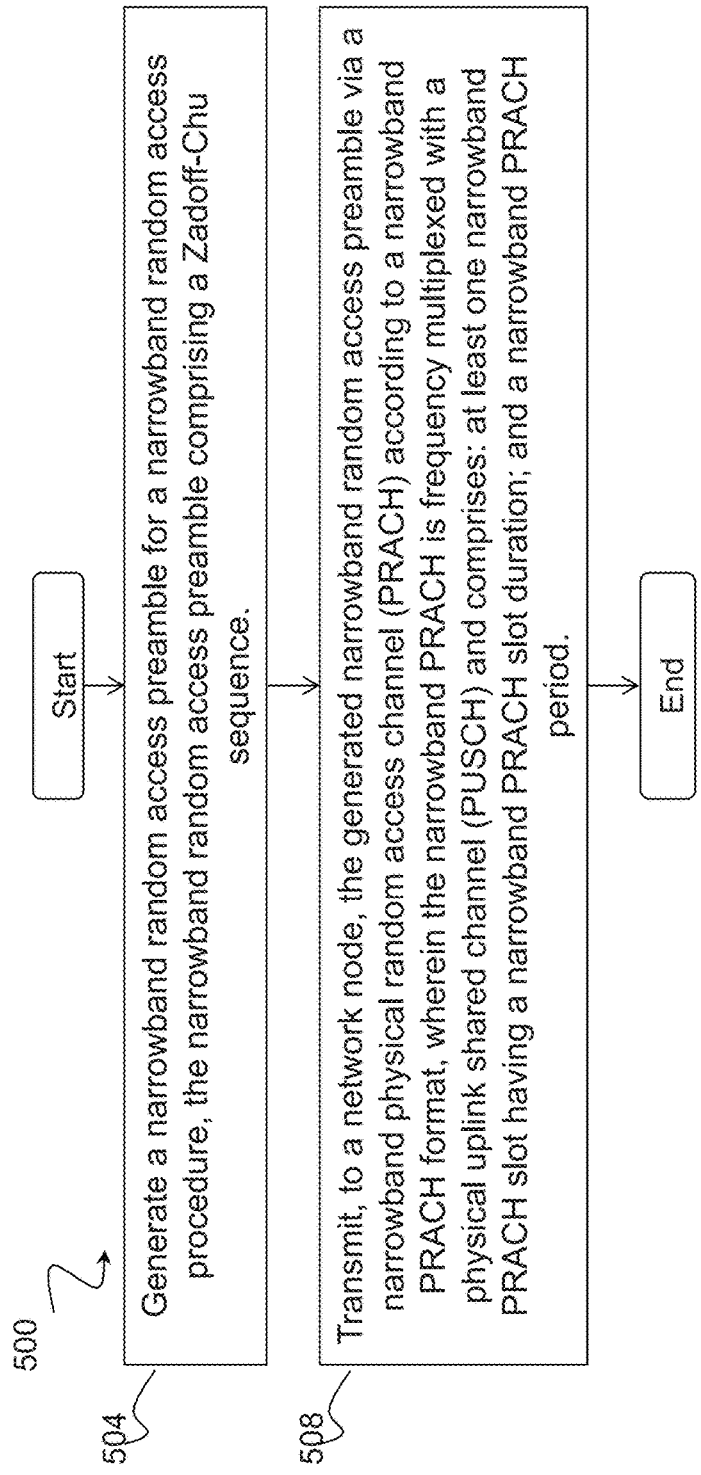
FIG. 5 is a flow diagram of a method in a user equipment, in accordance with certain embodiments.

FIG. 5 is a flow diagram of a method 500 in a user equipment, in accordance with certain embodiments. The method begins at step 504, where the user equipment generates a narrowband random access preamble for a narrowband random access procedure, the narrowband random access preamble comprising a Zadoff-Chu sequence. In certain embodiments, the narrowband random access preamble may be a Zadoff-Chu sequence of length 491. The generated narrowband random access preamble may comprise a duration of 3.2 ms.

At step 508, the user equipment transmits, to a network node, the generated narrowband random access preamble via a narrowband physical random access channel (PRACH) according to a narrowband PRACH format, wherein the narrowband PRACH is frequency multiplexed with a physical uplink shared channel (PUSCH) and comprises: at least one narrowband PRACH slot having a narrowband PRACH slot duration; and a narrowband PRACH period. In certain embodiments, the narrowband PRACH may comprise a subcarrier spacing of 312.5 Hz. The narrowband PRACH may comprise at least one subcarrier guard band between the PRACH and the PUSCH. The narrowband PRACH slot duration and the narrowband PRACH period may be based on one or both of: a cell load of a cell associated with the network node; and a cell size of the cell associated with the network node. The narrowband PRACH slot duration may be 12 ms. The narrowband PRACH may comprise a cyclic prefix of 0.4 ms and a guard time of 0.4 ms.

In certain embodiments, the narrowband PRACH slot may comprise at least one narrowband PRACH segment. The method may comprise randomly selecting one of a plurality of possible narrowband random access preambles as the narrowband random access preamble to generate, and randomly selecting one of the at least one narrowband PRACH segments for transmitting the selected one of the plurality of possible narrowband random access preambles.

In certain embodiments, the method may comprise determining a coverage level of the user equipment, and selecting, based on the determined coverage level of the user equipment, the narrowband PRACH format from among one or more narrowband PRACH formats. The coverage level of the user equipment may comprise one or more of a basic coverage level, a robust coverage level, and an extreme coverage level. The method may comprise repeating transmission of the narrowband random access preamble according to the selected narrowband PRACH format.

Figure 6:
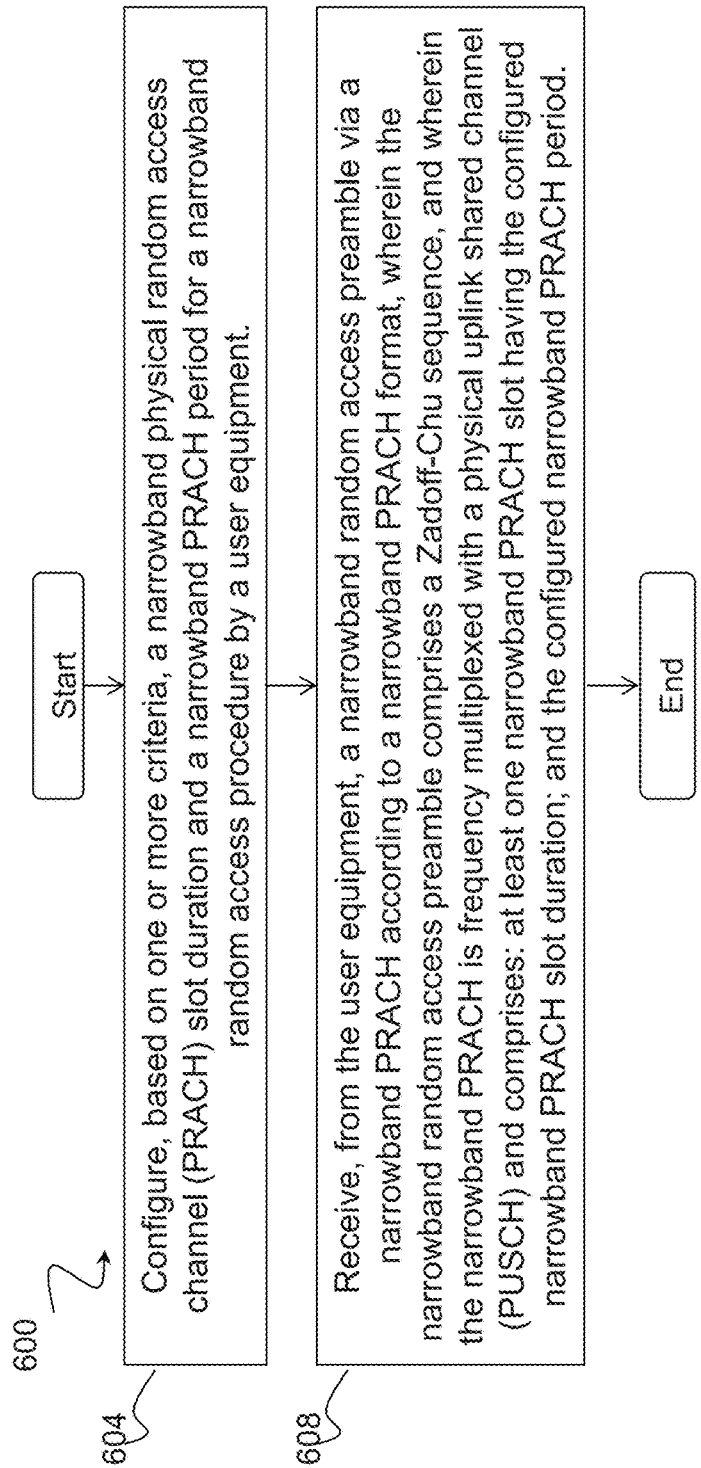
FIG. 6 is a flow diagram of a method in a network node, in accordance with certain embodiments.

FIG. 6 is a flow diagram of a method 600 in a network node, in accordance with certain embodiments. The method begins at step 604, where the network node configures, based on one or more criteria, a narrowband physical random access channel (PRACH) slot duration and a narrowband PRACH period for a narrowband random access procedure by a user equipment. In certain embodiments, the one or more criteria may comprise one or more of: a cell load of a cell associated with the network node; and a cell size of the cell associated with the network node. The configured narrowband PRACH slot duration may be 12 ms. The narrowband PRACH slot may comprise at least one narrowband PRACH segment.

At step 608, the network node receives, from the user equipment, a narrowband random access preamble via a narrowband PRACH according to a narrowband PRACH format, wherein the narrowband random access preamble comprises a Zadoff-Chu sequence, and wherein the narrowband PRACH is frequency multiplexed with a physical uplink shared channel (PUSCH) and comprises: at least one narrowband PRACH slot having the configured narrowband PRACH slot duration; and the configured narrowband PRACH period. In certain embodiments, the narrowband random access preamble may be a Zadoff-Chu sequence of length 491. The narrowband PRACH may comprise a subcarrier spacing of 312.5 Hz. In certain embodiments, the narrowband PRACH may comprise at least one subcarrier guard band between the narrowband PRACH and the PUSCH. The received narrowband random access preamble may comprise a duration of 3.2 ms. The narrowband PRACH may comprise a cyclic prefix of 0.4 ms and a guard time of 0.4 ms.

In certain embodiments, the method may comprise configuring the user equipment to randomly select one of a plurality of possible narrowband random access preambles to generate. The method may comprise configuring the user equipment to randomly select one of the at least one narrowband PRACH segments for transmitting the selected one of the plurality of possible narrowband random access preambles. In certain embodiments, the method may comprise determining the narrowband PRACH format according to which the narrowband random access preamble was received. The method may comprise determining a coverage level of the user equipment based on the determined narrowband PRACH format. The coverage level of the user equipment may comprise one or more of a basic coverage level, a robust coverage level, and an extreme coverage level. The narrowband PRACH format according to which the narrowband random access preamble was received may be determined based on a number of repeat transmissions of the narrowband random access preamble. In certain embodiments, the method may comprise scheduling the user equipment according to the determined coverage level of the user equipment.

Figure 7:
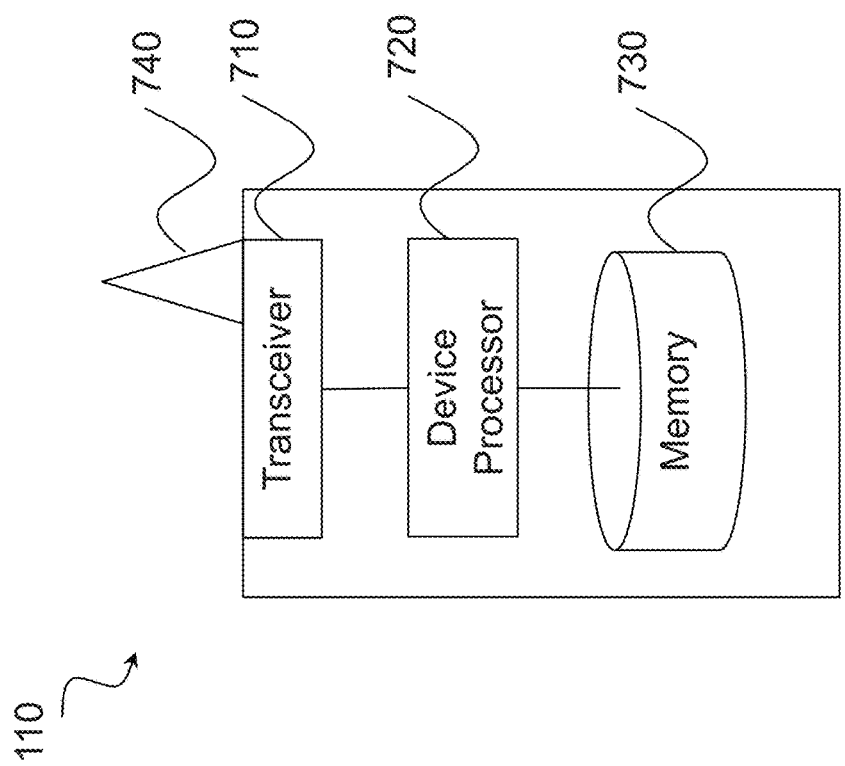
FIG. 7 is a block schematic of an exemplary wireless device, in accordance with certain embodiments.

FIG. 7 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via antenna 740), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110, such as the functions of wireless device 110 described above in relation to FIGS. 1-6. In some embodiments, processor 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 720. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
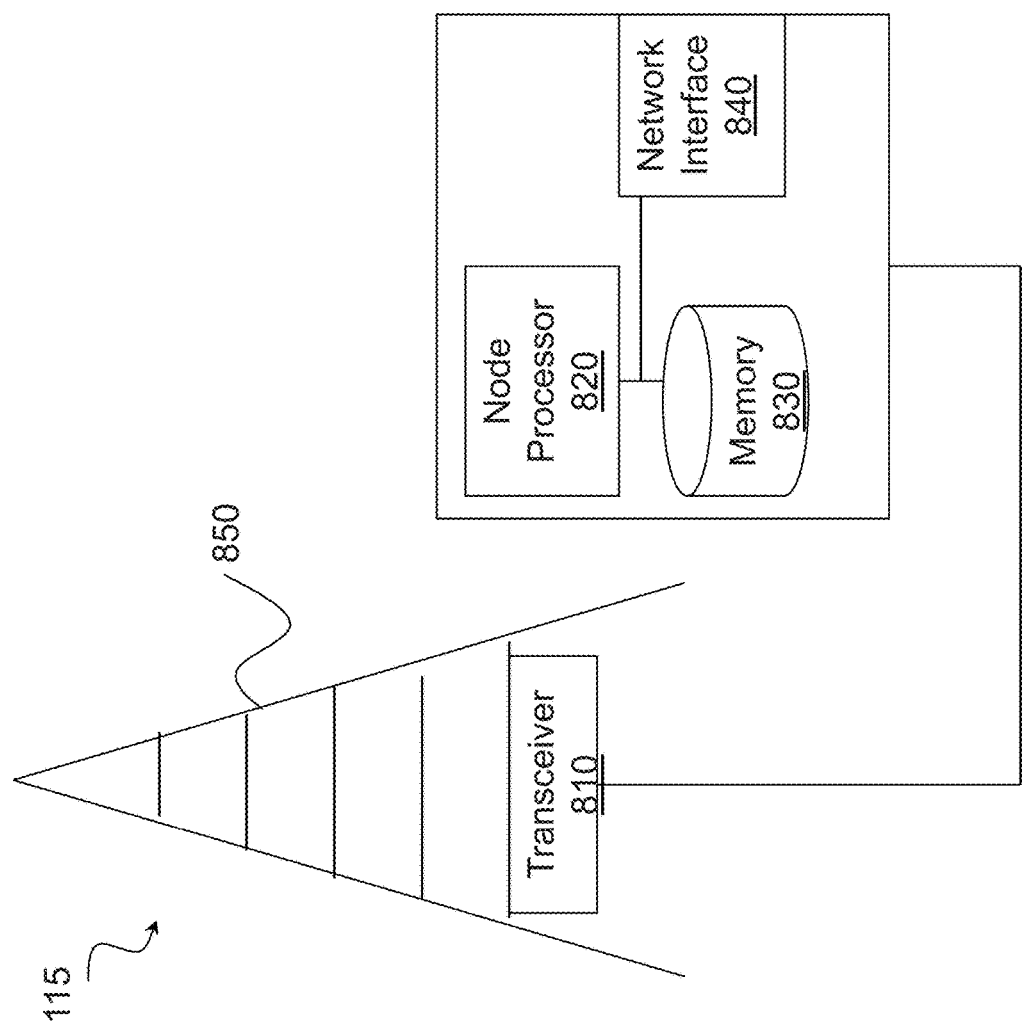
FIG. 8 is a block schematic of an exemplary network node, in accordance with certain embodiments.

FIG. 8 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via antenna 850), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes or radio network controllers 130, etc.

Processor 820 may include any suitable combination of hardware and software implemented in one or more modules to execute instructions and manipulate data to perform some or all of the described functions of network node 115, such as those described above in relation to FIGS. 1-6 above. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
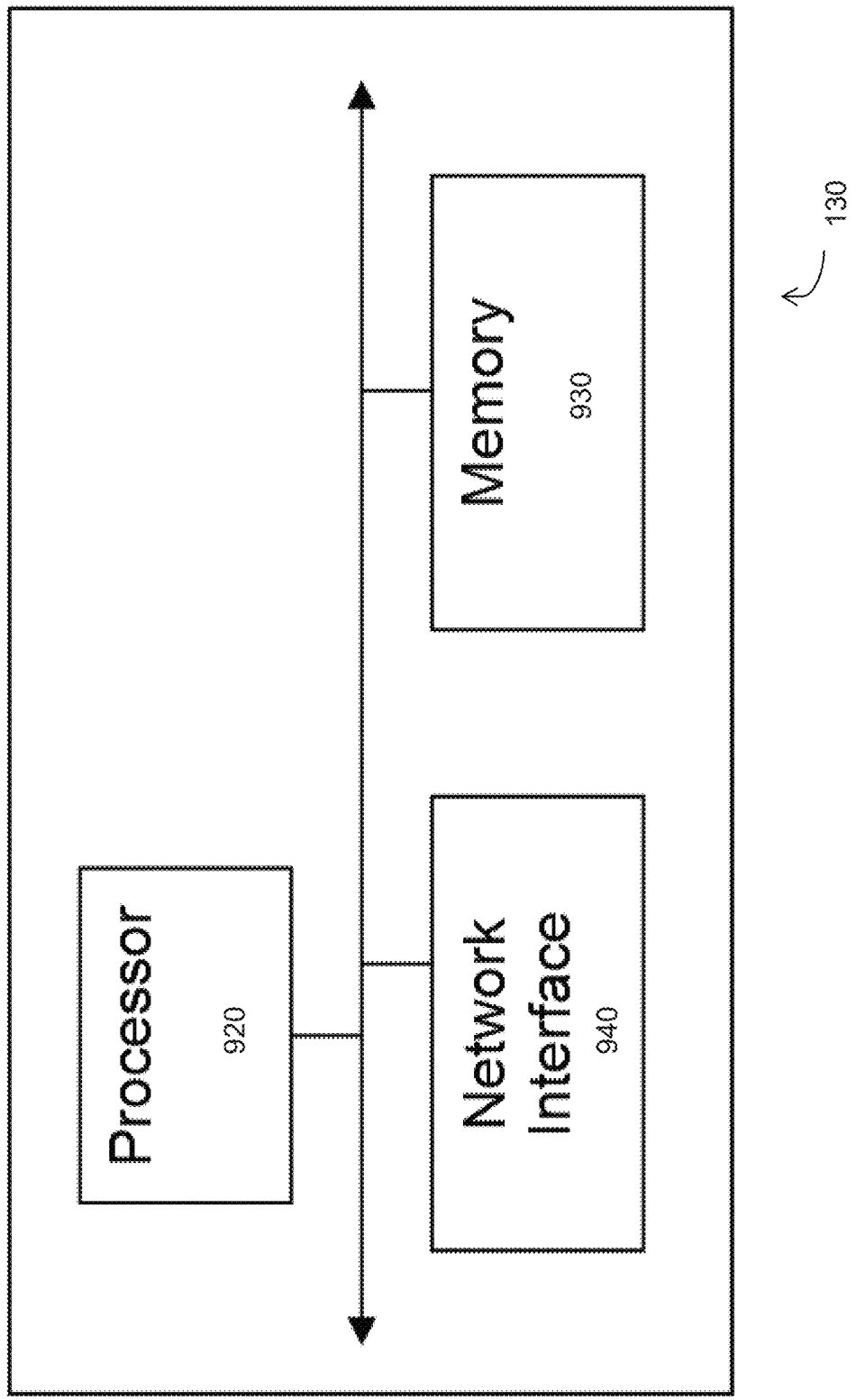
FIG. 9 is a block schematic of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 130, etc.

Processor 920 may include any suitable combination of hardware and software implemented in one or more modules to execute instructions and manipulate data to perform some or all of the described functions of the radio network controller or core network node 130. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

FIG. 10 is a block schematic of an exemplary wireless device, in accordance with certain embodiments. Wireless device 110 may include one or more modules. For example, wireless device 110 may include a determining module 1010, a communication module 1020, a receiving module 1030, an input module 1040, a display module 1050, and any other suitable modules. Wireless device 110 may perform the methods for NB PRACH design described above with respect to FIGS. 1-6.

Determining module 1010 may perform the processing functions of wireless device 110. For example, determining module 1010 may generate a narrowband random access preamble for a narrowband random access procedure, the narrowband random access preamble comprising a Zadoff-Chu sequence. As another example, determining module 1010 may randomly select one of a plurality of possible narrowband random access preambles as the narrowband random access preamble to generate. As still another example, determining module 1010 may randomly select one of the at least one narrowband PRACH segments for transmitting the selected one of the plurality of possible narrowband random access preambles. As yet another example, determining module 1010 may determine a coverage level for wireless device 110. As yet another example, determining module 1010 may select, based on the determined coverage level of wireless device 110, the narrowband PRACH format from among one or more narrowband PRACH formats. Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 described above may, in certain embodiments, be performed in one or more distinct modules.

Communication module 1020 may perform the transmission functions of wireless device 110. For example, communication module 1020 may transmit, to a network node, the generated narrowband random access preamble via a narrowband PRACH according to a narrowband PRACH, wherein the narrowband PRACH is frequency multiplexed with a PUSCH and comprises: at least one narrowband PRACH slot having a narrowband PRACH slot duration; and a narrowband PRACH period. As another example, communication module 1020 may repeat transmission of the narrowband random access preamble according to the selected narrowband PRACH format. Communication module 1020 may transmit messages to one or more of network nodes 115 of network 100. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010. In certain embodiments, the functions of communication module 1020 described above may be performed in one or more distinct modules.

Receiving module 1030 may perform the receiving functions of wireless device 110. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of wireless device 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. Wireless device 110 may include additional modules beyond those shown in FIG. 10 that may be responsible for providing any suitable functionality, including any of the functionality described above and/or any additional functionality (including any functionality necessary to support the various solutions described herein).

FIG. 11 is a block schematic of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processor 820 described above in relation to FIG. 8. In certain embodiments, the functions of two or more of the various modules may be combined into a single module. Network node 115 may perform the methods for NB LTE PRACH design described above with respect to FIGS. 1-6.

Determining module 1110 may perform the processing functions of network node 115. As one example, determining module 1110 may configure, based on one or more criteria, a narrowband PRACH slot duration and a narrowband PRACH period for a narrowband random access procedure by a user equipment. As another example, determining module 1110 may configure the user equipment to randomly select one of a plurality of possible narrowband random access preambles to generate. As still another example, determining module 1110 may configure the user equipment to randomly select one of the at least one narrowband PRACH segments for transmitting the selected one of the plurality of possible narrowband random access preambles. As yet another example, determining module 1120 may determine the narrowband PRACH format according to which the narrowband random access preamble was received. As yet another example, determining module 1120 may determine a coverage level of the user equipment based on the determined narrowband PRACH format. As yet another example, determining module 1120 may schedule the user equipment according to the determined coverage level of the user equipment. Determining module 1110 may include or be included in one or more processors, such as processor 820 described above in relation to FIG. 8. Determining module 1110 may include analog and/or digital circuitry configured to perform any of the functions of determining module 1110 and/or processor 820 described above. The functions of determining module 1110 may, in certain embodiments, be performed in one or more distinct modules. For example, in certain embodiments some of the functionality of determining module 1110 may be performed by an allocation module.

Communication module 1120 may perform the transmission functions of network node 115. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. As one example, receiving module 1130 may receive, from the user equipment, a narrowband random access preamble via a narrowband PRACH according to a narrowband PRACH format, wherein the narrowband random access preamble comprises a Zadoff-Chu sequence, and wherein the narrowband PRACH is frequency multiplexed with a PUSCH and comprises: at least one narrowband PRACH slot having the configured narrowband PRACH slot duration; and the configured narrowband PRACH period. Receiving module 1130 may receive any suitable information from a wireless device. Receiving module 1130 may include a receiver and/or a transceiver, such as transceiver 810 described above in relation to FIG. 8. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
AP Access Point
BS Base Station
BSC Base Station Controller
BTS Base Transceiver Station
CIoT Cellular Internet of Things
CP Cyclic Prefix
CPE Customer Premises Equipment
D2D Device-to-device
DAS Distributed Antenna System
DL Downlink
eNB evolved Node B
FDD Frequency Division Duplex
GERAN GSM/EDGE Radio Access Network
GT Guard Time
GSM Global System for Mobile communications
IoT Internet of Things
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MSR Multi-standard Radio
NAS Non-Access Stratum
NB Narrowband
OFDM Orthogonal Frequency Division Multiplexing
OFDMA Orthogonal Frequency Division Multiple Access
PDCCH Physical Downlink Control Channel
PDSCH Physical Downlink Shared Channel
PRACH Physical Random Access Channel
PSTN Public Switched Telephone Network
PUSCH Physical Uplink Shared Channel
PUCCH Physical Uplink Control Channel
RB Resource Block
RNC Radio Network Controller
RRC Radio Resource Control
RRH Remote Radio Head
RRU Remote Radio Unit
TDD Time Division Duplex
UE User Equipment
UL Uplink
WAN Wide Area Network

The invention claimed is:

1. A method in a user equipment, comprising:
determining a coverage level of the user equipment,
selecting a configuration of a time-frequency narrowband physical random access channel (PRACH) resource,
determining, based on the determined coverage level of the user equipment, a number of repetitions for a narrowband random access preamble,
transmitting, to a network node, a narrowband random access message via said PRACH resource, wherein the narrowband random access message includes a repetition of the same said narrowband random access preamble according to the determined number of repetitions,
wherein the narrowband PRACH resource is frequency multiplexed with a narrowband physical uplink shared channel (PUSCH).

2. The method of claim 1, wherein the coverage level of the user equipment comprises one or more of a basic coverage level, a robust coverage level, and an extreme coverage level.

3. The method of claim 1, wherein the repetitions of the same narrowband random access preamble are transmitted consecutively.

4. The method of claim 1, wherein the narrowband PRACH resource has a narrowband PRACH slot duration and a narrowband PRACH period, wherein the narrowband PRACH slot duration and the narrowband PRACH period are based on one or both of:
a cell load of a cell associated with the network node; and
a cell size of the cell associated with the network node.

5. A method in a network node, comprising:
configuring a configuration of one or more time-frequency physical random access channel (PRACH) resources based on coverage levels of a plurality user equipments served by the network node,
receiving, from a user equipment, a narrowband random access message via one of the narrowband PRACH resources,
wherein the narrowband random access message includes a repetition of the same narrowband random access preamble according to a selected number of repetitions which is determined based on the coverage level,
wherein the one or more time-frequency PRACH resources are frequency multiplexed with a PUSCH.

6. The method of claim 5, wherein the coverage level of the user equipment comprises one or more of a basic coverage level, a robust coverage level, and an extreme coverage level.

7. The method of claim 5, the repetitions of the same narrowband random access preamble are received consecutively.

8. The method of claim 5, wherein each of the one or more time-frequency narrowband PRACH resources has a narrowband PRACH slot duration and a narrowband PRACH period, wherein the narrowband PRACH slot duration and the narrowband PRACH period are based on one or both of:
a cell load of a cell associated with the network node; and
a cell size of the cell associated with the network node.

9. The method of claim 5, wherein the number of times the narrowband random access preamble is repeated is based on a determined coverage level of the user equipment, the coverage level of the user equipment comprising one or more of a basic coverage level, a robust coverage level, and an extreme coverage level.

10. A user equipment, comprising:
one or more processors, the one or more processors configured to:
determine a coverage level of the user equipment,
select, based on the determined coverage level of the user equipment, a configuration of a time-frequency narrowband physical random access channel (PRACH) resource,
determine, based on the determined coverage level of the user equipment, a number of repetitions for a narrowband random access preamble,
transmit, to a network node, a narrowband random access message via said PRACH resource, wherein the narrowband random access message includes a repetition of the same said narrowband random access preamble according to the selected number of repetitions,
wherein the narrowband PRACH resource is frequency multiplexed with a narrowband physical uplink shared channel (PUSCH).

11. The user equipment of claim 10, wherein the coverage level of the user equipment comprises one or more of a basic coverage level, a robust coverage level, and an extreme coverage level.

12. The user equipment of claim 10, wherein the repetitions of the same narrowband random access preamble are transmitted consecutively.

13. The user equipment of claim 10, wherein the narrowband PRACH resource is frequency multiplexed with a narrowband PUSCH.

14. The user equipment of claim 10, wherein the narrowband PRACH resource has a narrowband PRACH slot duration and a narrowband PRACH period, wherein the narrowband PRACH slot duration and the narrowband PRACH period are based on one or both of:
   a cell load of a cell associated with the network node; and
   a cell size of the cell associated with the network node.

15. A network node, comprising:
   one or more processors, the one or more processors configured to:
   configure one or more time-frequency physical random access channel (PRACH) resources based on coverage levels of a plurality user equipments served by the network node,
   receive, from a user equipment, a narrowband random access message via one of the narrowband PRACH resources,
   wherein the narrowband random access message includes a repetition of the same narrowband random access preamble according to a selected number of repetitions which is determined based on the coverage level,
   wherein the one or more time-frequency PRACH resources are frequency multiplexed with a PUSCH.

16. The network node of claim 15, the repetitions of the same narrowband random access preamble are received consecutively.

17. The network node of claim 15, wherein each of the one or more time-frequency narrowband PRACH resources has a narrowband PRACH slot duration and a narrowband PRACH period, wherein the narrowband PRACH slot duration and the narrowband PRACH period are based on one or both of:
   a cell load of a cell associated with the network node; and
   a cell size of the cell associated with the network node.

18. The network node of claim 15, wherein the number of times the narrowband random access preamble is repeated is based on a determined coverage level of the user equipment, the coverage level of the user equipment comprising one or more of a basic coverage level, a robust coverage level, and an extreme coverage level.

* * * * *